US011620284B2

(12) United States Patent
Arnett et al.

(10) Patent No.: US 11,620,284 B2
(45) Date of Patent: Apr. 4, 2023

(54) BACKEND DATA AGGREGATION SYSTEM AND METHOD (71) Applicant: INMOMENT RESEARCH, LLC, South Jordan, UT (US)

(72) Inventors: Bruce Alan Arnett, Lehi, UT (US); Daniel Michael Korzeniewski, Perrysburg, OH (US); Zackery Jon Walker, Draper, UT (US); Devin Joseph Martin, American Fork, UT (US)

(73) Assignee: INMOMENT RESEARCH, LLC, South Jordan, UT (US)

( * ) Notice: Subject to any disclaimer, the term of this patent is extended or adjusted under 35 U.S.C. 154(b) by 0 days.

(21) Appl. No.: 16/747,829

(22) Filed: Jan. 21, 2020

(65) Prior Publication Data
US 2020/0233867 A1    Jul. 23, 2020

Related U.S. Application Data (60) Provisional application No. 62/794,227, filed on Jan. 18, 2019.

(51) Int. Cl.
*G06F 16/00* (2019.01)
*G06F 16/2452* (2019.01)
*G06F 16/21* (2019.01)
*G06F 16/25* (2019.01)
*G06F 16/242* (2019.01)

(52) U.S. Cl.
CPC ...... *G06F 16/24522* (2019.01); *G06F 16/211* (2019.01); *G06F 16/244* (2019.01); *G06F 16/254* (2019.01)

(58) Field of Classification Search
CPC ............. G06F 16/24522; G06F 16/254; G06F 16/244; G06F 16/221; G06F 16/211; G06F 16/2452; G06F 16/242; G06F 16/25; G06F 16/21; G06F 16/245
See application file for complete search history.

(56) References Cited

U.S. PATENT DOCUMENTS

| 2017/0139956 A1* | 5/2017 | Qiao | H04L 67/02 |
| 2017/0262495 A1* | 9/2017 | Peloski | G06F 16/2246 |
| 2019/0188289 A1* | 6/2019 | Suzuki | G06F 16/221 |

* cited by examiner

*Primary Examiner* — Tony Mahmoudi
*Assistant Examiner* — Suman Rajaputra
(74) *Attorney, Agent, or Firm* — Stinson LLP (57) ABSTRACT A backend data aggregation and customer experience (CX) systems and methods for processing very-large enterprise CX data. A columnar data store has a transform processor coupled thereto via a data communication network. The transform processor is configured to receive customer experience data from a plurality of data sources and to dynamically transform the received data into a columnar data schema format for storage in the columnar data store. A dynamic Object-Relational Mapper (ORM) is configured to dynamically map the transformed data to structured data based on metadata associated therewith and to store the structured data in the columnar data store.

20 Claims, 5 Drawing Sheets

BACKEND DATA AGGREGATION SYSTEM AND METHOD

CROSS-REFERENCE TO RELATED APPLICATION

This application claims the benefit of U.S. Provisional Patent Application No. 62/794,227, filed Jan. 18, 2019, the contents of which are incorporated by reference in their entirety for all purposes.

BACKGROUND

Customer experience (CX) users often require custom solutions providing fast load times for their data. But such solutions are not flexible for large, uncleansed data usually found in large enterprise customer experience programs. The CX software and expert services marketplace is an industry saturated with software vendors claiming to understand the complexities of enterprise customer experience management. Conventional enterprise organizations (i.e., those having $1 billion or more in annual revenue) have been forced to choose between: (1) data cube technology (i.e., SQL Server, Star Schema, SQL, and the like), which focuses on speed without the flexibility and scale necessary to power large enterprise customer experience programs; or (2) big data technology (i.e., Hadoop, NoSchema, NoSQL, Elastic Search, and the like), which focuses on giving enterprises the flexibility necessary to process thousands of data sources that lack any form of data cleansing or normalization without regard to query speed for fast load times.

Very Large Enterprise (VLE) customer experience often consists of hundreds of millions of records, millions of survey responses and feedback data points added daily, frequent data structure changes (e.g., survey changes, sample file changes), and real-time analytic requirements for non-static reports and live feedback management. Even with constant testing and updates to provide greater performance and scale for an enterprise customer base, large data imports often fail with conventional technology platforms due to a restrictive survey send throughput, dashboard and chart load times for large numbers of users that are too long/time out, large exports that are delayed and time out, and extensive database contentions that cause unreliable data collection.

Any time an enterprise client reloads its data or makes extensive changes, presently available CX technology reprocesses every data point—even if the data point had not been changed—making survey changes on any large enterprise client a "weekend job" because of the number of responses in the system. In addition, the speed/ability of data import/ export typically has a 50,000 data limit on large enterprise clients with 50 columns allowed per append. Whenever a present platform sends a survey, the files have to be broken up into smaller files, causing send times in the hours.

In light of the difficulties managing VLE CX data, there is a need for a solution with the capabilities of query speed combined with flexibility.

SUMMARY

Aspects of the present disclosure work with a Kafka data backbone to power complex CX programs with the speed and flexibility necessary to power efficient business operations. As the number of users increases, more and more people need to access data, including reports and the like, which can strain the CX technology system. Aspects of the present disclosure permit users to do more than simply survey and use text analytics, hierarchies, and other frontline reports. An improved technology architecture using a Kafka data backbone provides a much more efficient method of querying the data that is more scalable/flexible.

In an aspect, a backend data aggregation system for processing very-large enterprise customer experience data comprises a columnar data store and a transform processor coupled to the columnar data store via a data communication network. The transform processor is configured to receive customer experience data from a plurality of data sources and to dynamically transform the received data into a columnar data schema format for storage in the columnar data store. The system further comprises a dynamic Object-Relational Mapper (ORM) configured to dynamically map the transformed data to structured data based on metadata associated therewith and to store the structured data in the columnar data store.

In another aspect, a method of processing very-large enterprise customer experience data comprises receiving customer experience data from a plurality of data sources, dynamically transforming the received data into a columnar data schema format for storage in a columnar data store, dynamically mapping, by a dynamic Object-Relational Mapper (ORM), the transformed data to structured data based on metadata associated therewith, and storing the structured data in the columnar data store.

In yet another aspect, a customer experience (CX) reporting system comprises one or more processors and one or more memory devices coupled to the one or more processors. The memory devices store computer-executable instructions that, when executed by the processors, configure the processors to receive customer experience data from a plurality of data sources, dynamically transform the received data into a columnar data schema format for storage in a columnar data store, dynamically map the transformed data to structured data based on metadata associated therewith, and store the structured data in the columnar data store.

Other objects and features will be in part apparent and in part pointed out hereinafter.

BRIEF DESCRIPTION OF THE DRAWINGS

Corresponding reference characters indicate corresponding parts throughout the drawings.

DETAILED DESCRIPTION

Figure 1:
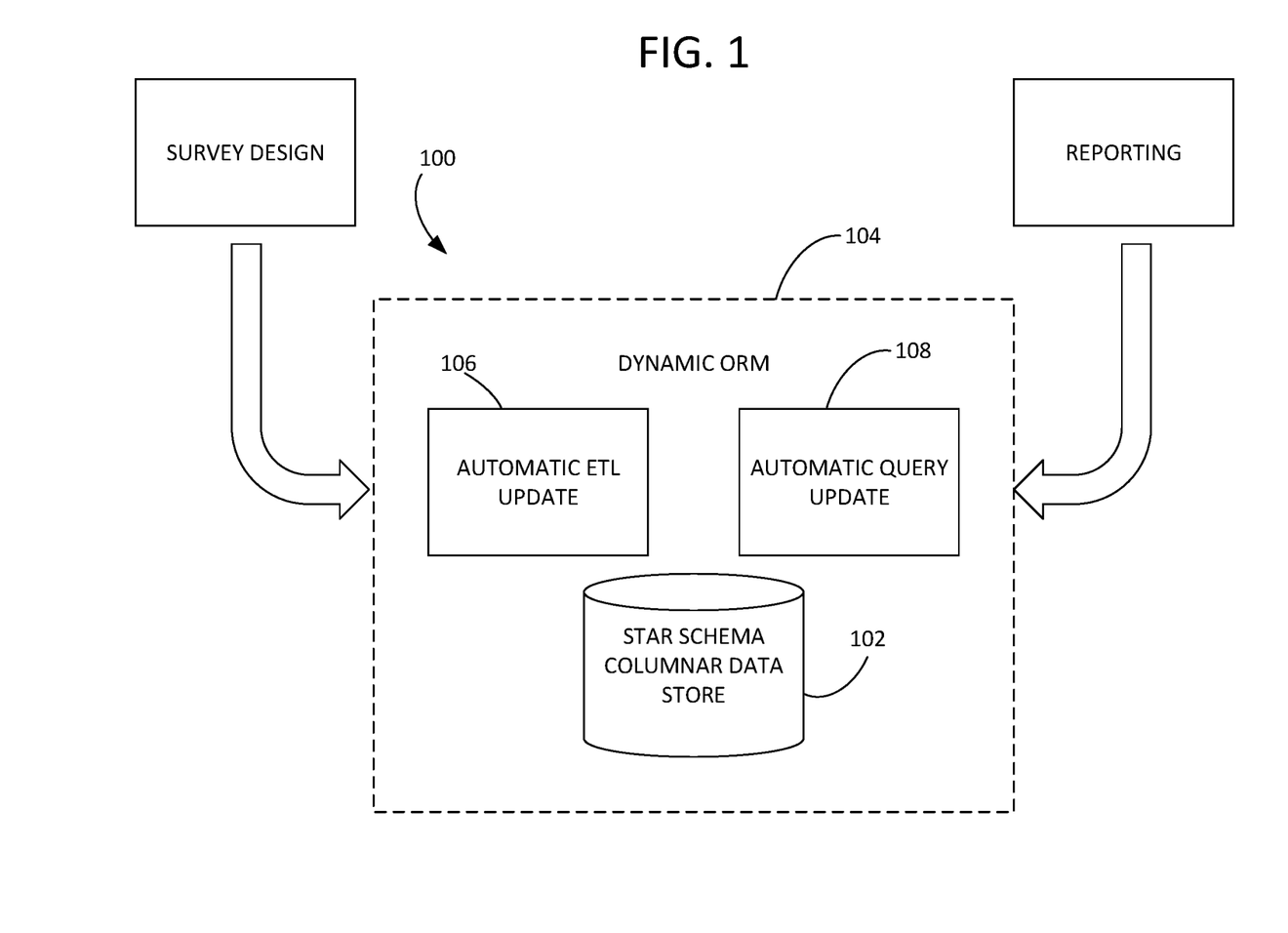
FIG. 1 illustrates a backend data aggregation system and an exemplary operational flow therefor according to an embodiment.

A backend data aggregation system 100 embodying aspects of the present disclosure is referred to herein as "RocketCX" as shown in FIG. 1. As explained below, the system 100 combines a dynamic columnar data store 102 with a dynamic Object-Relational Mapper (ORM) 104, a dynamic Extract Transform Load (ETL) process 106, and an automatic query update processor 108. The system 100 advantageously combines the flexibility of a NoSQL (not only SQL) database with the query speed of cube technology to enable handling the data complexities of hundreds of thousands of users and billions of records.

Figure 2:
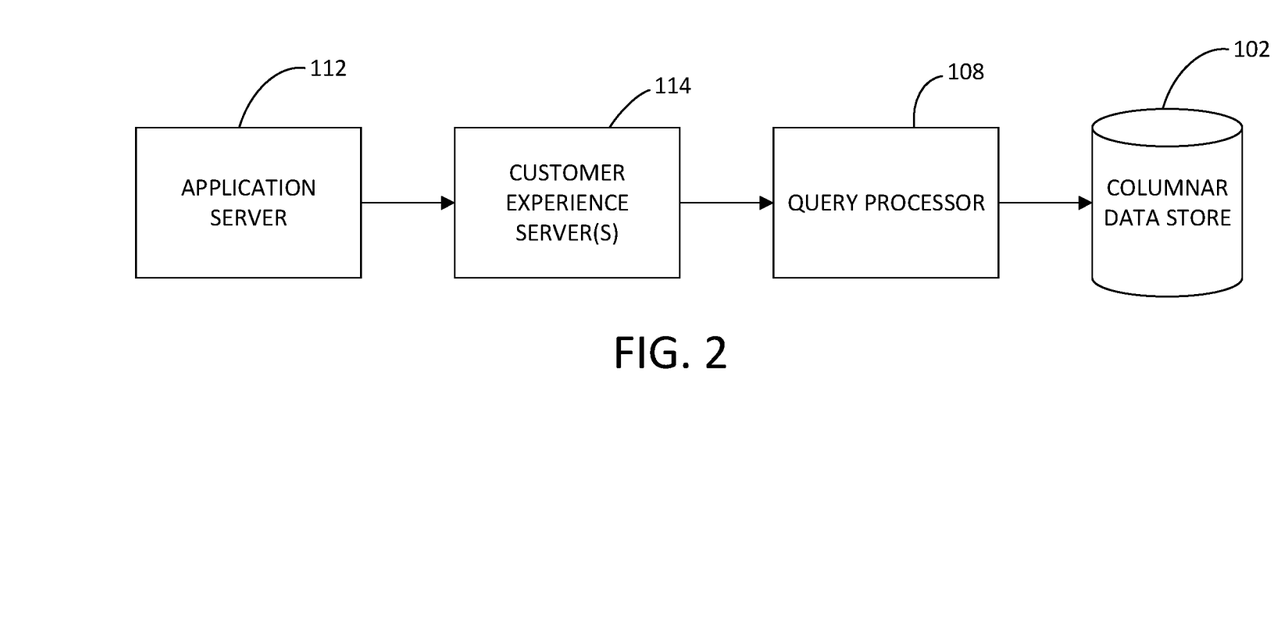
FIG. 2 illustrates the backend data aggregation system of FIG. 1 interacting with an application programming interface (API) according to an embodiment.

FIG. 2 illustrates interaction of system 100 with an application programming interface (API) according to an embodiment. A web application 112 sends a request with a query to one or more CX servers 114, which is part of the RocketCX system 100. The CX server 114 parses the query. Using the metadata from columnar data store 102, CX server 114 translates the parsed query into, for example, SQL. The query processor 108 executes the query against columnar data store 102, which results in the retrieval and aggregation of SQL data needed by the web application 112 to display the data in a visualized format for a user. Although not shown in FIG. 2, the ETL process 106 populates columnar data store 102

The RocketCX system 100 encompasses everything from CX server 114 to columnar data store 102. In addition, system 100 includes the ETL process 106 that populates columnar data store 102. The CX server 114 in one embodiment is a physical/virtual server and the query processor 108 is part of an API. The columnar data store 102 provides efficient means for aggregating data. In an embodiment, ETL process 106 quickly transforms the data into a schema format suitable for columnar data store 102 and the dynamic ORM component 104, which is integrated into the RocketCX system 100, adds flexibility to the speed and scale of columnar data store 102.

Figure 3:
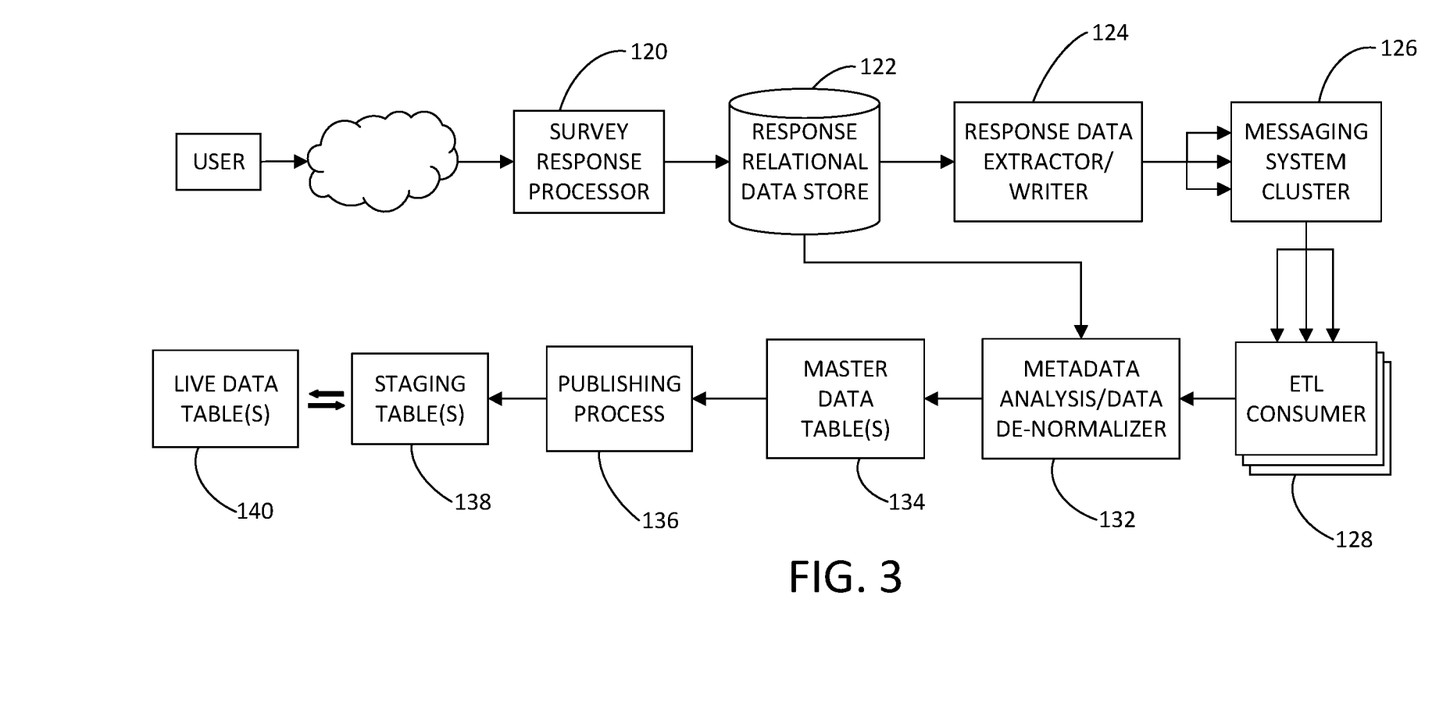
FIG. 3 illustrates the backend data aggregation system of FIG. 1 interacting with an Extract Transform Load (ETL) process according to an embodiment.

FIG. 3 illustrates the RocketCX backend data aggregation system 100 interacting with ETL process 106 to populate columnar data store 102 according to an embodiment. As shown, a user takes a survey, which is then sent to a survey response processor 120. It is to be understood that the survey response processor 120 could be embodied by query processor 108. The survey response processor 120 processes the received survey data and stores the processed data in a database 122 using a relational format. An extractor/writer component 124 pulls the response data from the database 122 and broadcasts it through stream-processing of topics (e.g., Kafka Topics) by a messaging system cluster 126. A series of ETL consumers 128 receives the response data from the messaging cluster 126. Based on the relational data, a metadata analysis and data de-normalizer component 132 creates/updates a columnar store table 134 in columnar data store 102 to reflect a flattened version of the survey. Using the columnar data store table 134, the respondent data is inserted/updated based on the data from the processed topic. Once the data is inserted, a publishing process 136 publishes the data to staging tables 138 with optimized indexes, which can be "swapped" into live tables 140.

FIG. 3 illustrates an operational flow for populating columnar data store 102, which the RocketCX system 100 uses to retrieve and aggregate data, streaming data in near real-time, notifying system 100 that the report data structures have changed (fields added, removed, data type changes), and allowing system 100 to dynamically re-form the data structure as part of the ETL process 106. The illustrated structure is an efficient way of transforming the data into the columnar data store 102, which benefits the client by providing near-real time data.

In an embodiment, system 100 functions as the backend data aggregation piece for a frontline reporting and action planning toolset for customer experience programs, such as FieldCX available from MaritzCX. In another embodiment, system 100 functions as the backend data aggregation piece for other CX products.

Referring again to FIG. 1, backend data aggregation system 100 is built on dynamic ORM 104. Through the combination of columnar data store 102, dynamic ORM 104, and dynamic ETL process 106, the RocketCX system 100 combines NoSQL flexibility with the query speed of cube technology to send customer experience data to various customer experience platform applications, resulting in nearly instantaneous dashboard load times on aggregate customer data represented in graphs/charts, minute extract transform load times, complete survey flexibility requiring no engineering overhead, dynamic dashboard functionality, and instant crosstabs, for the purpose of increasing customer satisfaction, consumer potential, consumer business loyalty, and brand equity. The RocketCX system is configured to meet the demands of VLE clients having hundreds of thousands of users and billions of records. The integration of the columnar data store with the dynamic ORM 104 and ETL 106 reduces ETL time to provide quicker responses, reduce query time (e.g., aggregated data in graphs/charts loads quickly), and support flexibility (e.g., surveys, sample files, and dashboards can be changed without any engineering overhead).

Figure 4:
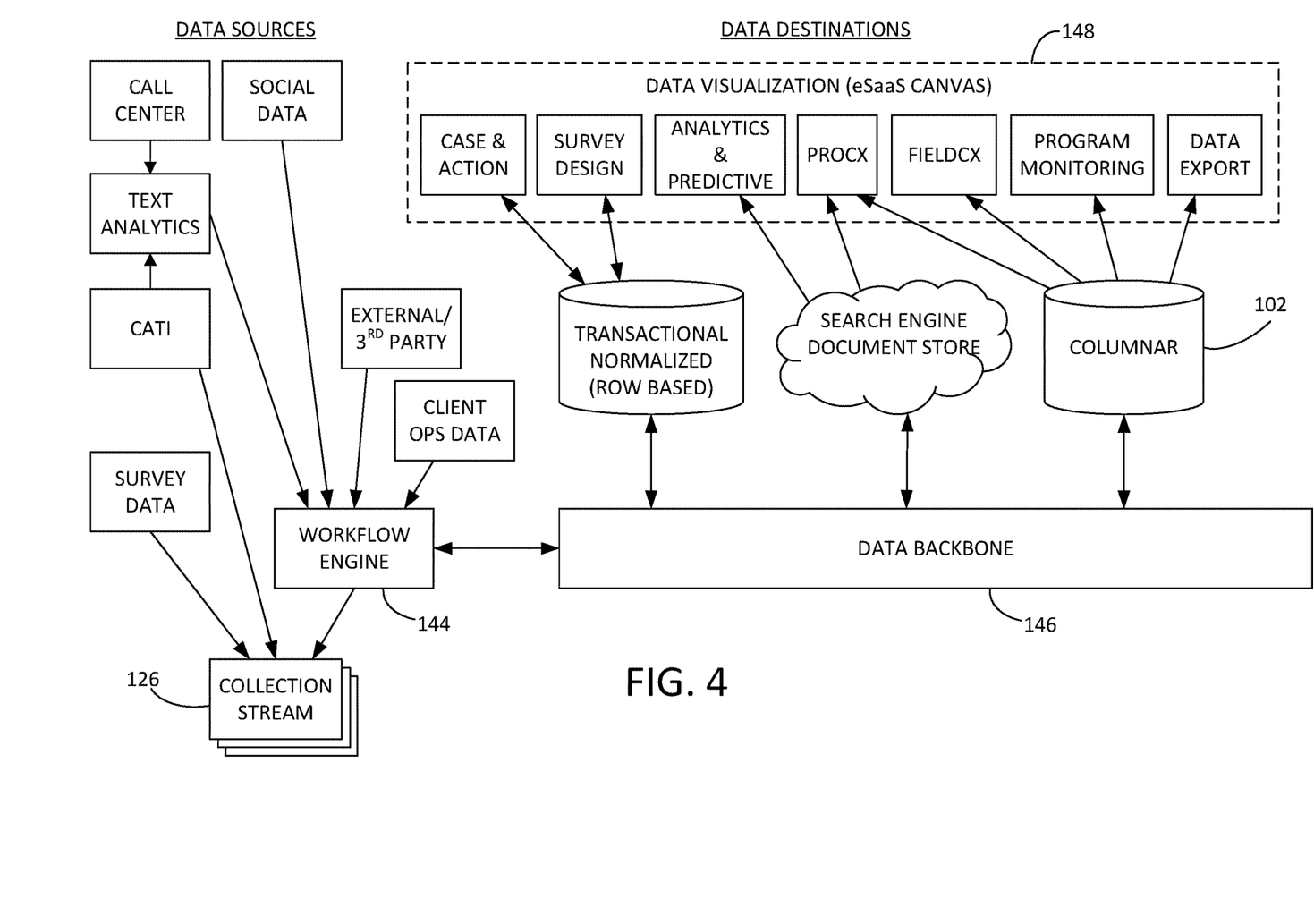
FIG. 4. illustrates a VLE architecture according to an embodiment.

FIG. 4. Illustrates a VLE customer experience architecture in which backend aggregation system 100 embodying aspects of the present disclosure is used. In the illustrated embodiment, a plurality of data sources provide data to a customer experience workflow engine 144 for input into the collection stream (i.e., messaging cluster 126). A data backbone 146 connects the workflow engine 144 to system 100. As an example, a stream-processing software platform such as Kafka available from Apache Software Foundation embodies the data backbone 146, workflow engine 144, and message cluster 126 to implement ETL process 106. Once populated, the columnar data store 102 is available for queries and the response data can be reported via a variety of data visualization tools 148.

Figure 5:
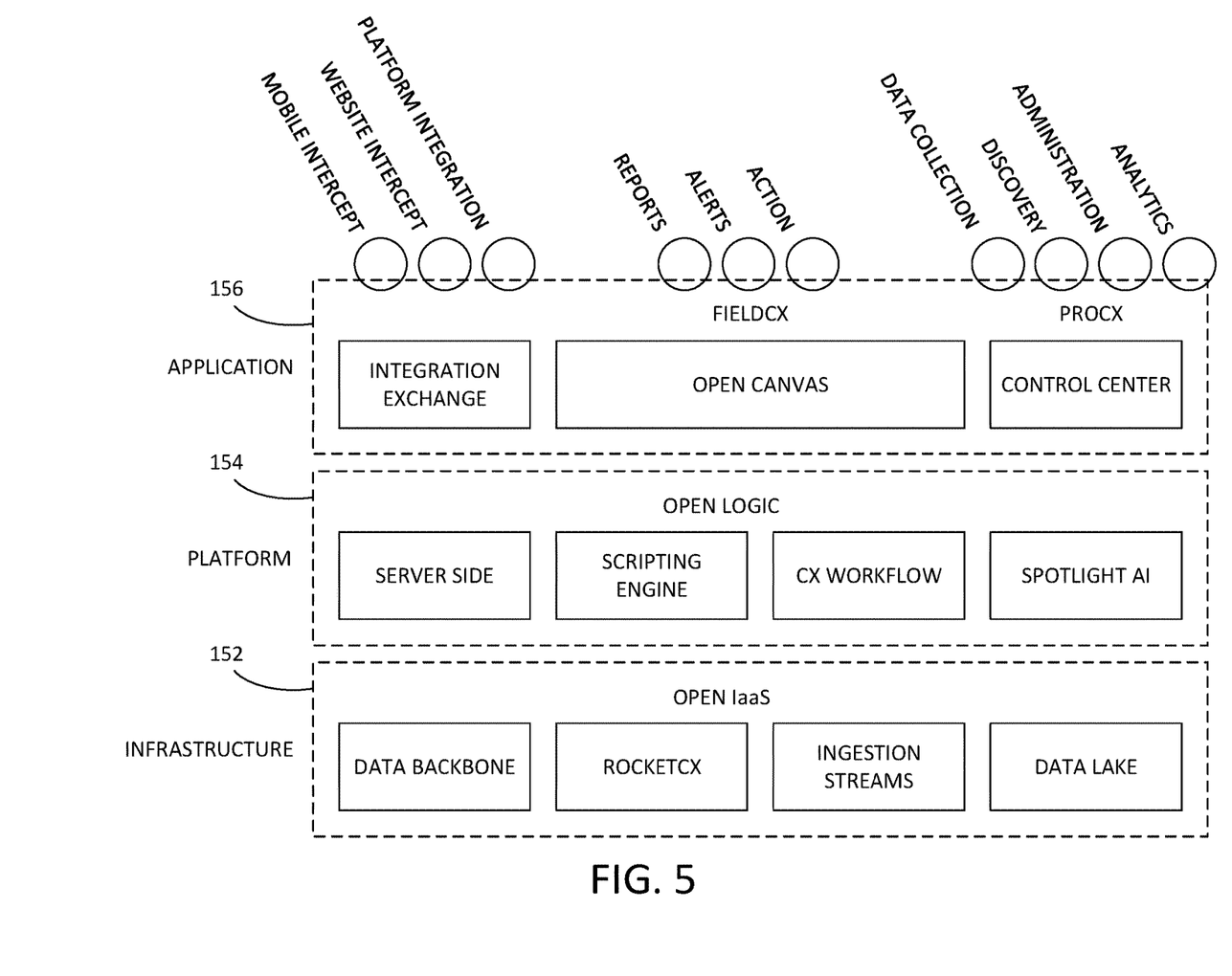
FIG. 5. illustrates a software architecture according to an embodiment.

Referring now to FIG. 5, an exemplary software architecture for the RocketCX system 100 includes an infrastructure layer 152, a platform layer 154, and an application layer 156. In an embodiment, infrastructure layer 152 includes system 100. Advantageously, aspects of the present disclosure employing the illustrated architecture enable millisecond query times and flexibility in reporting changes. Search and transaction-optimized data services enable critical real-time functions. Automated data imports and exports mapped via a workflow interface (e.g., CXWorkflow) that cleanses, normalizes, connects, and enriches CX data. In addition, the software architecture shown uses GDPR compliant and ISO-certified practices of optimal data security.

In addition to the embodiments described above, embodiments of the present disclosure may comprise a special purpose computer including a variety of computer hardware, as described in greater detail below.

Embodiments within the scope of the present disclosure also include computer-readable media for carrying or having computer-executable instructions or data structures stored thereon. Such computer-readable media can be any available media that can be accessed by a special purpose computer and comprises computer storage media and communication media. By way of example, and not limitation, computer storage media include both volatile and nonvolatile, removable and non-removable media implemented in any method or technology for storage of information such as computer readable instructions, data structures, program modules or other data. Computer storage media are non-transitory and include, but are not limited to, random access memory (RAM), read only memory (ROM), electrically erasable programmable ROM (EEPROM), compact disk ROM (CD-ROM), digital versatile disks (DVD), or other optical disk storage, solid state drives (SSDs), magnetic cassettes, magnetic tape, magnetic disk storage, or other magnetic storage devices, or any other medium that can be used to carry or store desired non-transitory information in the form of computer-executable instructions or data structures and that can be accessed by a computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media. Computer-executable instructions comprise, for example, instructions and data which cause a general purpose computer, special purpose computer, or special purpose processing device to perform a certain function or group of functions.

The following discussion is intended to provide a brief, general description of a suitable computing environment in which aspects of the disclosure may be implemented. Although not required, aspects of the disclosure will be described in the general context of computer-executable instructions, such as program modules, being executed by computers in network environments. Generally, program modules include routines, programs, objects, components, data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represent examples of corresponding acts for implementing the functions described in such steps.

Those skilled in the art will appreciate that aspects of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Aspects of the disclosure may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An exemplary system for implementing aspects of the disclosure includes a special purpose computing device in the form of a conventional computer, including a processing unit, a system memory, and a system bus that couples various system components including the system memory to the processing unit. The system bus may be any of several types of bus structures including a memory bus or memory controller, a peripheral bus, and a local bus using any of a variety of bus architectures. The system memory computer storage media, including nonvolatile and volatile memory types. A basic input/output system (BIOS), containing the basic routines that help transfer information between elements within the computer, such as during start-up, may be stored in ROM. Further, the computer may include any device (e.g., computer, laptop, tablet, PDA, cell phone, mobile phone, a smart television, and the like) that is capable of receiving or transmitting an IP address wirelessly to or from the internet.

The computer may also include a magnetic hard disk drive for reading from and writing to a magnetic hard disk, a magnetic disk drive for reading from or writing to a removable magnetic disk, and an optical disk drive for reading from or writing to removable optical disk such as a CD-ROM or other optical media. The magnetic hard disk drive, magnetic disk drive, and optical disk drive are connected to the system bus by a hard disk drive interface, a magnetic disk drive-interface, and an optical drive interface, respectively. The drives and their associated computer-readable media provide nonvolatile storage of computer-executable instructions, data structures, program modules, and other data for the computer. Although the exemplary environment described herein employs a magnetic hard disk, a removable magnetic disk, and a removable optical disk, other types of computer readable media for storing data can be used, including magnetic cassettes, flash memory cards, digital video disks, Bernoulli cartridges, RAMs, ROMs, SSDs, and the like.

Communication media typically embody computer readable instructions, data structures, program modules or other data in a modulated data signal such as a carrier wave or other transport mechanism and includes any information delivery media.

Program code means comprising one or more program modules may be stored on the hard disk, magnetic disk, optical disk, ROM, and/or RAM, including an operating system, one or more application programs, other program modules, and program data. A user may enter commands and information into the computer through a keyboard, pointing device, or other input device, such as a microphone, joy stick, game pad, satellite dish, scanner, or the like. These and other input devices are often connected to the processing unit through a serial port interface coupled to the system bus. Alternatively, the input devices may be connected by other interfaces, such as a parallel port, a game port, or a universal serial bus (USB). A monitor or another display device is also connected to the system bus via an interface, such as video adapter. In addition to the monitor, personal computers typically include other peripheral output devices (not shown), such as speakers and printers.

One or more aspects of the disclosure may be embodied in computer-executable instructions (i.e., software), routines, or functions stored in system memory or nonvolatile memory as application programs, program modules, and/or program data. The software may alternatively be stored remotely, such as on a remote computer with remote application programs. Generally, program modules include routines, programs, objects, components, data structures, etc. that perform particular tasks or implement particular abstract data types when executed by a processor in a computer or other device. The computer executable instructions may be stored on one or more tangible, non-transitory computer readable media (e.g., hard disk, optical disk, removable storage media, solid state memory, RAM, etc.) and executed by one or more processors or other devices. As will be appreciated by one of skill in the art, the functionality of the program modules may be combined or distributed as desired in various embodiments. In addition, the functionality may be embodied in whole or in part in firmware or hardware equivalents such as integrated circuits, application specific integrated circuits, field programmable gate arrays (FPGA), and the like.

The computer may operate in a networked environment using logical connections to one or more remote computers. The remote computers may each be another personal computer, a tablet, a PDA, a server, a router, a network PC, a peer device, or other common network node, and typically include many or all of the elements described above relative to the computer. The logical connections include a local area network (LAN) and a wide area network (WAN) that are presented here by way of example and not limitation. Such networking environments are commonplace in office-wide or enterprise-wide computer networks, intranets and the Internet.

When used in a LAN networking environment, the computer is connected to the local network through a network interface or adapter. When used in a WAN networking environment, the computer may include a modem, a wireless link, or other means for establishing communications over the wide area network, such as the Internet. The modem, which may be internal or external, is connected to the system bus via the serial port interface. In a networked environment, program modules depicted relative to the computer, or portions thereof, may be stored in the remote memory storage device. It will be appreciated that the network connections shown are exemplary and other means of establishing communications over wide area network may be used.

Preferably, computer-executable instructions are stored in a memory, such as the hard disk drive, and executed by the computer. Advantageously, the computer processor has the capability to perform all operations (e.g., execute computer-executable instructions) in real-time.

The order of execution or performance of the operations in embodiments illustrated and described herein is not essential, unless otherwise specified. That is, the operations may be performed in any order, unless otherwise specified, and embodiments may include additional or fewer operations than those disclosed herein. For example, it is contemplated that executing or performing a particular operation before, contemporaneously with, or after another operation is within the scope of aspects of the disclosure.

Embodiments may be implemented with computer-executable instructions. The computer-executable instructions may be organized into one or more computer-executable components or modules. Aspects of the disclosure may be implemented with any number and organization of such components or modules. For example, aspects of the disclosure are not limited to the specific computer-executable instructions or the specific components or modules illustrated in the figures and described herein. Other embodiments may include different computer-executable instructions or components having more or less functionality than illustrated and described herein.

When introducing elements of aspects of the disclosure or the embodiments thereof, the articles "a", "an", "the" and "said" are intended to mean that there are one or more of the elements. The terms "comprising", "including", and "having" are intended to be inclusive and mean that there may be additional elements other than the listed elements.

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A backend data aggregation system for processing very-large enterprise customer experience data comprising:
   at least one backend processor configured to receive customer experience data from a plurality of data sources via the data communication network;
   a database coupled to the at least one backend processor via a data communication network, the database storing the data received from the plurality of data sources in a relational format, the data received from the plurality of data sources having metadata associated therewith;
   a columnar data store coupled to the at least one backend processor via the data communication network; and
   at least one non-transitory memory device coupled to the backend processor via the data communication network, the memory device storing computer-executable instructions that, when executed by the backend processor, configure the backend processor to dynamically transform the data received from the plurality of data sources based on the metadata associated therewith from the relational format into a columnar data schema format suitable for storage in the columnar data store and to populate the columnar data store with the transformed data; and
   wherein the memory device further stores a dynamic Object-Relational Mapper (ORM) that, when executed by the backend processor, configures the backend processor to dynamically map the transformed data in the columnar data store to structured data based on the metadata associated therewith for retrieval from the columnar data store and aggregation by the backend processor in response to a query.

2. The system of claim 1, wherein the at least one backend processor comprises a customer experience (CX) processor coupled to the columnar data store via the data communication network, and wherein the memory devices further store computer-executable instructions that, when executed by the CX processor, configure the CX processor to receive a request for a query from a user via a web application and parse the query into a structured query language.

3. The system of claim 2, wherein the at least one backend processor comprises a query processor coupled to the columnar data store via the data communication network, and wherein the memory devices further store computer-executable instructions that, when executed by the query processor, configure the query processor to execute the parsed query against the columnar data store to retrieve structured data responsive to the query.

4. The system of claim 3, further comprising a display coupled to the query processor via the data communication network, the display configured to display the retrieved structured data in an aggregated format for the user.

5. The system of claim 2, wherein the memory devices further store computer-executable instructions that, when executed by the CX processor, configure the CX processor to parse the query as a function of the metadata associated with the structured data stored in the columnar data store.

6. The system of claim 5, wherein the memory devices further store computer-executable instructions that, when executed by the CX processor, configure the CX processor to translate the query into Structured Query Language (SQL) using the metadata.

7. The system of claim 1, wherein the at least one backend processor comprises a transform processor, and wherein the memory devices further store an Extract Transform Load process that, when executed by the transform processor, configure the transform processor to dynamically transform the data into the columnar data schema format.

8. The system of claim 7, further comprising a messaging cluster coupled to the transform processor via the data communication network, the messaging cluster configured to perform stream processing on the data received from the plurality of data sources, wherein the transform processor dynamically transforms the stream processed data into the columnar data schema format.

9. A method of processing very-large enterprise customer experience data comprising:
   receiving customer experience data from a plurality of data sources;
   storing the data received from the plurality of data sources in a relational format, the data received from the plurality of data sources having metadata associated therewith;
   dynamically transforming, by at least one backend processor, the data received from the plurality of data sources based on the metadata associated therewith from the relational format into a columnar data schema format suitable for storage in a columnar data store, the backend processor and the columnar data store coupled to the plurality of data sources and to each other via a data communication network;
   populating the columnar data store with the transformed data;
   dynamically mapping, by a dynamic Object-Relational Mapper (ORM) executed by the backend processor, the transformed data in the columnar data store to structured data based on metadata associated therewith; and
   retrieving and aggregating the structured data in the columnar data store by the backend processor in response to a query.

10. The method of claim 9, further comprising receiving, by the backend processor, a request for a query from a user via a web application and parsing, by the backend processor, the query into a structured query language.

11. The method of claim 10, further comprising executing, by the backend processor, the parsed query against the columnar data store to retrieve structured data responsive to the query.

12. The method of claim 11, further comprising displaying the retrieved structured data in an aggregated format for the user.

13. The method of claim 10, wherein parsing the query comprises parsing the query as a function of the metadata associated with the structured data stored in the columnar data store.

14. The method of claim 13, further comprising translating the query into Structured Query Language (SQL) using the metadata.

15. The method of claim 9, wherein transforming the data comprises executing an Extract Transform Load process to dynamically transform the data into the columnar data schema format.

16. The method of claim 9, further comprising performing, by the backend processor, stream processing on the data received from the plurality of data sources, wherein transforming the data comprises dynamically transforming the stream processed data into the columnar data schema format.

17. A customer experience (CX) reporting system comprising:
   one or more backend processors;
   a columnar data store coupled to the one or more backend processors via a data communication network;
   a database coupled to the one or more backend processors via the data communication network;
   one or more memory devices coupled to the one or more backend processors via the data communication network, the one or more memory devices storing computer-executable instructions that, when executed by the one or more backend processors, configure the one or more backend processors to:
      receive customer experience data from a plurality of data sources coupled to the one or more backend processors via the data communication network;
      store the data received from the plurality of data sources in the database in a relational format, the data received from the plurality of data sources having metadata associated therewith;
      dynamically transform, by an Extract Transform Load process executed by the one or more backend processors, the data received from the plurality of data sources based on the metadata associated therewith from the relational format into a columnar data schema format suitable for storage in the columnar data store;
      populate the columnar data store with the transformed data;
      dynamically map, by an Object-Relational Mapper executed by the one or more backend processors, the transformed data in the columnar data store to structured data based on metadata associated therewith; and
      retrieve and aggregate the structured data in the columnar data store by the one or more backend processors in response to a query; and
   a display coupled to the one or more backend processors via the data communication network, the display configured to display, in an aggregated format, the structured data retrieved from the columnar data store in response to the query.

18. The system of claim 17, wherein the computer-executable instructions, when executed by the one or more backend processors, further configure the one or more backend processors to receive a request for the query from a user via a web application, parse the query into a structured query language, execute the parsed query against the columnar data store to retrieve structured data responsive to the query, and display the retrieved structured data in the aggregated format for the user.

19. The system of claim 18, wherein the computer-executable instructions, when executed by the one or more backend processors, further configure the one or more backend processors to parse the query as a function of the metadata associated with the structured data stored in the columnar data store.

20. The system of claim 17, wherein the computer-executable instructions, when executed by the one or more backend processors, further configure the one or more backend processors to perform stream processing on the data received from the plurality of data sources and to dynamically transform the stream processed data into the columnar data schema format.

* * * * *